(12) United States Patent
Zhou

(10) Patent No.: US 10,101,903 B2
(45) Date of Patent: Oct. 16, 2018

(54) INFORMATION SEARCH

(71) Applicant: Alibaba Group Holding Limited, Grand Cayman (KY)

(72) Inventor: Wen Zhou, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 412 days.

(21) Appl. No.: 14/861,924

(22) Filed: Sep. 22, 2015

(65) Prior Publication Data

US 2016/0092100 A1    Mar. 31, 2016

(30) Foreign Application Priority Data

Sep. 25, 2014   (CN) .......................... 2014 1 0498392

(51) Int. Cl.
| | |
|---|---|
| *G06F 3/00* | (2006.01) |
| *G06F 3/0488* | (2013.01) |
| *G06F 3/041* | (2006.01) |
| *G06F 3/0484* | (2013.01) |
| *G06F 17/30* | (2006.01) |
| *G06F 3/01* | (2006.01) |

(52) U.S. Cl.
CPC ........ *G06F 3/04883* (2013.01); *G06F 3/0416* (2013.01); *G06F 3/0484* (2013.01); *G06F 17/30991* (2013.01)

(58) Field of Classification Search
None
See application file for complete search history.

(56) References Cited

U.S. PATENT DOCUMENTS

| | | | |
|---|---|---|---|
| 2007/0040813 A1 | 2/2007 | Kushler et al. | |
| 2008/0168396 A1* | 7/2008 | Matas ................ | G01C 21/3664 715/840 |
| 2009/0307217 A1 | 12/2009 | Liu et al. | |
| 2011/0196864 A1 | 8/2011 | Mason et al. | |
| 2013/0227418 A1* | 8/2013 | Sa .......................... | G06F 3/0488 715/728 |
| 2014/0019912 A1* | 1/2014 | Zhang ................... | G06F 3/0482 715/810 |
| 2014/0082561 A1 | 3/2014 | Yu et al. | |
| 2014/0333524 A1* | 11/2014 | Liu ......................... | G06F 3/017 345/156 |
| 2015/0026620 A1* | 1/2015 | Kwon ................. | G06F 3/04845 715/770 |
| 2015/0248235 A1* | 9/2015 | Offenberg ........... | G06F 3/04886 715/773 |

OTHER PUBLICATIONS

PCT Search Report and Written Opinion dated Dec. 11, 2015 for PCT Application No. PCT/US15/51536, 9 pages.

* cited by examiner

*Primary Examiner* — Toan Vu
(74) *Attorney, Agent, or Firm* — Lee & Hayes, PLLC

(57) ABSTRACT

An example information search method includes: obtaining a plurality of paths on a screen of a mobile terminal generated by sliding two or more fingers on the screen, in which one finger corresponds to one path; determining whether the plurality of paths is consistent; if the determining result is positive, generating a search interface calling signal; and displaying a search interface based on the search interface calling signal. Thus, the techniques of the present disclosure enhance information search efficiency.

19 Claims, 3 Drawing Sheets

INFORMATION SEARCH

CROSS-REFERENCE TO RELATED PATENT APPLICATION

This application claims foreign priority to Chinese Patent Application No. 201410498392.9 filed on 25 Sep. 2014, entitled "Information Search Method, Device, and Electronic Apparatus", which is hereby incorporated by reference in its entirety.

TECHNICAL FIELD

The present disclosure relates to the field of mobile terminals, and, more particularly, to an information search method, device, and electronic apparatus.

BACKGROUND

With the rapid progress of science and technology, mobile terminals, such as cell phones, tablet computers, and so on, have become important and indispensible tools in people's daily life and work. In addition to offering the basic function of making phone calls and providing short message service (SMS), mobile terminals further offer various service functions via various application programs (App), for example, navigation service, shopping function, etc.

In order to enable users to find information that they are interested as soon as possible, most Apps are configured with a search function, so that the users may search information through the App. Conventionally, a common search method is that a search interface is shown on a page at the top of the interface of the App to enable the users to input a keyword in the search interface for searching. The search interface is also called a search bar, which may be classified into an embedded search bar and a floating search bar.

The embedded search bar is embedded at a fixed position at a web page, and moves as the web page is switched. With respect to the embedded search bar, if its position is not set properly (for example, the search bar is only shown at the top of the web page), user browsing at a random position on the web page or browsing at a bottom part of the web page needs to switch back to the top part of the web page to find the search bar and perform the search operation. The search bar being set at the bottom part of the web page has similar problems. Both the top part and the bottom part of the web page being configured with a search bar takes more system resources. In addition, with respect to the embedded search bar, when the web page is zoomed in, the search bar shrinks correspondingly. As a result, time is wasted to find the search bar.

The floating search bar floats above the web page, and is always shown at a fixed position on the screen, instead of moving as the web page is switched. The portability of mobile terminal restricts the screen of the mobile terminal having a relatively small size. When the floating search bar takes a large space on the screen, the space for the users to browse other information is reduced. If the floating search bar is small, the user cannot find out the search bar at a first sight. Meanwhile, the floating search bar also consumes more system resources, which may influence user experience.

As a conclusion, the conventional search interface is not configured properly at the mobile terminals, which not only wastes the user's time to find the search interface and deteriorates the information search efficiency, but also consumes too many system resources.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides an information search method, which enhances searching efficiency.

To solve the above technical problems, the present disclosure provides an example information providing method, which may include the following operations:

obtaining a plurality of paths on a screen of a mobile terminal generated by sliding two or more ojbectgs such as fingers on the screen, in which one finger corresponds to one path;

determining whether the plurality of paths is consistent;

if a determining result is yes, generating a search interface calling signal; and displaying a search interface based on the search interface calling signal.

Optionally, the determining whether the plurality of paths is consistent may include the following operations:

determining whether directions of the plurality of paths are consistent; and if the directions of the plurality of paths are consistent, the plurality of paths are determined to be consistent.

Optionally, the determining whether the plurality of paths is consistent may include the following operations:

determining whether a mean square deviation of start time points of the plurality of paths is smaller than a first threshold; and if the mean square deviation of the plurality of start time points is smaller than the first threshold, the plurality of paths is determined to be consistent.

Optionally, the determining whether the plurality of paths is consistent may include the following operations:

determining whether a mean square deviation of end time points of the plurality of paths is smaller than a second threshold; and if the mean square deviation of the plurality of end time points is smaller than the second threshold, the plurality of paths is determined to be consistent.

Optionally, the determining whether the plurality of paths is consistent may include the following operations:

determining whether shapes of the plurality of paths are similar; and if the shapes of the plurality of paths are similar, the plurality of paths is determined to be consistent.

The present disclosure further provides an information search device applicable to mobile terminals. The device may include the following units:

an obtaining unit that obtains a plurality of paths on a screen of a mobile terminal generated by sliding two or more objects such as fingers on the screen, in which one finger corresponds to one path;

a determining unit that determines whether the plurality of paths is consistent;

a processing unit that generates a search interface calling signal if the plurality of paths is consistent; and a displaying unit that displays a search interface based on the search interface calling signal.

Optionally, the determining unit may include a direction determining sub-unit that determines whether directions of the plurality of paths are consistent and, if the directions of the plurality of paths are consistent, determines that the plurality of paths are consistent.

Optionally, the determining unit may include a first mean square deviation determining sub-unit that determining whether a mean square deviation of start time points of the plurality of paths is smaller than a first threshold and, if the mean square deviation of the plurality of start time points is smaller than the first threshold, determines that the plurality of paths is consistent.

Optionally, the determining unit may include a second mean square deviation determining sub-unit that determines whether a mean square deviation of end time points of the plurality of paths is smaller than a second threshold and, if the mean square deviation of the plurality of end time points is smaller than the second threshold, determines that the plurality of paths is consistent.

Optionally, the determining unit may include a shape determining sub-unit that determines whether shapes of the plurality of paths are similar and, if the shapes of the plurality of paths are similar, determines that the plurality of paths is consistent.

The present disclosure further provides an electronic device. The electronic device may include:

a touch screen;

one or more processors; and one or more memories that store a global interface calling program and at least one application, in which when the application is executed by the processors, the touch screen at least displays an application main interface and several application operation interfaces; when the global interface calling program is executed by the processors, if any one of the application main interface and the several application operation interfaces monitors an input operation performed by sliding at least two objects such as fingers along the touch screen to generate consistent paths, the application main interface or the several application operation interfaces show a search interface, which is stacked on the application main interface or the several application operation interfaces, and the search interface is presented for inputting a search word by a user.

The information search method provided in the embodiment of the present disclosure calls a search interface by determining whether the paths generated by sliding two or more objects such as fingers on the screen of the mobile terminal are consistent in a global scope, to enable a user to search information via the search interface, which is convenient and fast, saves time, enhances searching efficiency, and offers better user experience for users. In addition, the information search method provided in the embodiment of the present disclosure presents the search interface on any page in the App by using a gesture, without setting an independent search interface on the page, thereby saving system resources.

BRIEF DESCRIPTION OF DRAWINGS

The accompanying drawings are intended to offer further understanding of the present disclosure, and constitute part of the present disclosure. The example embodiments of the present disclosure and their corresponding descriptions are used for illustrating the present invention rather than restricting the present disclosure.

DETAILED DESCRIPTIONS

In order to illustrate the technical problems, technical solutions, and technical benefits of the present disclosure, the present disclosure is described below in detail with reference to the accompanying drawings and the example embodiments. It shall be understood that, the example embodiments described herein are merely used for illustrating the present disclosure, instead of restricting the present disclosure.

The present disclosure provides an information search method and an information search device applicable to mobile terminals, which save time, and enhance information search efficiency.

Figure 1:
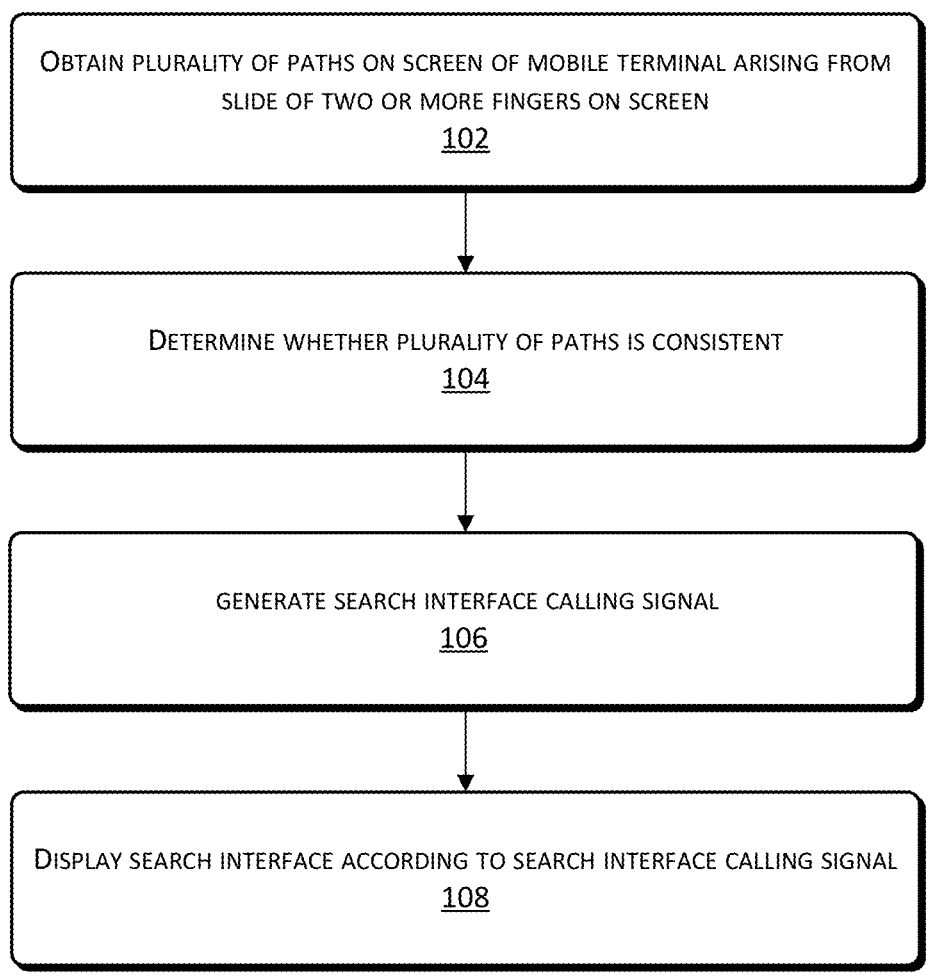
FIG. 1 is a flow chart of an example information search method according to the present disclosure.

FIG. 1 is a flow chart of an example information search method according to an example embodiment of the present disclosure. As shown in FIG. 1, the method includes:

At 102, a plurality of paths on a screen of a mobile terminal is obtained based on monitoring one or more slides of two or more objects such as fingers on the screen. One finger may correspond to one path. For example, the screen is a touch screen.

At 104, whether the plurality of paths is consistent is determined.

At 106, in response to determining that the plurality of paths is consistent, a search interface calling signal is generated.

At 108, a search interface is displayed according to the search interface calling signal.

In the example embodiment of the present disclosure, the search interface may also be called a search bar.

The information search method provided in the embodiment of the present disclosure displays a search interface by determining whether the paths generated by sliding two or more objects such as fingers on the screen of the mobile terminal are consistent or not in a global scope (i.e., user interactions are always monitored), to enable a user to search information via the search interface, which is convenient and fast, enhances searching efficiency, and offers better user experience for users. In addition, the information search method provided in the example embodiment of the present disclosure presents the search interface on any page in the App by using a gesture, without setting an independent search interface on the page, thereby saving system resources.

In the example embodiment of the present disclosure, at 104, there are muliple methods to determine whether whether the plurality of paths is consistent.

For example, at 104, the determining whether the plurality of paths is consistent may include: determining whether directions of the plurality of paths are consistent, and, if the directions of the plurality of paths are consistent, determining that the plurality of paths is consistent.

For another example, at 104, the determining whether the plurality of paths is consistent may include: determining whether a mean square deviation of start time points of the plurality of paths is smaller than a first threshold, and, if the mean square deviation of the plurality of start time points is smaller than the first threshold, determining that the plurality of paths is consistent.

For another example, at 104, the determining whether the plurality of paths is consistent may include: determining whether a mean square deviation of end time points of the plurality of paths is smaller than a second threshold, and, if the mean square deviation of the plurality of end time points is smaller than the second threshold, determining that the plurality of paths is consistent.

Ideally, operations performed on the screen by using two or more objects such as fingers shall be synchronous, that is, the sliding motions of a plurality of objects such as fingers shall be synchronous. That is, start time points of the plurality of objects such as fingers shall be the same, and end time points of the plurality of objects such as fingers shall be the same. However, in practical applications, the sliding motions of the plurality of objects such as fingers are not completely synchronous, so that the start time points of the plurality of paths may have a difference there between, and similarly, the end time points of two paths may have a difference there between either.

A first threshold is set based on experiences. Whether the sliding motions of the plurality of objects such as fingers on the screen is synchronous is determined by using a mean square deviation of start time points of the plurality of paths, thereby avoiding making mistakes when performing determination. When the mean square deviation of the differences of the plurality of paths is smaller than the first threshold, operations performed by the plurality of objects such as fingers corresponding to the plurality of paths are synchronous. Similarly, a second threshold is set based on the experience.

For another example, at 104, the determining whether the plurality of paths is consistent may include determining whether shapes of the plurality of paths are similar, and, if the shapes of the plurality of paths are similar, determining that the plurality of paths is consistent.

Ideally, if the operations performed by using a plurality of objects such as fingers corresponding to a plurality of paths are synchronous, the shapes of the plurality of paths shall be the same. However, in practical applications, a user generally use an index finger and a middle finger to perform operations, or use an index finger, a middle finger, and a ring finger to perform operations. Due to different lengths of different objects such as fingers and the restrictions of the wrist turning scope, etc., the shapes of the plurality of paths cannot be completely the same. Thus, in the example embodiment, if the shapes of the plurality of paths are similar, the plurality of paths is determined to be consistent. A similarity degree threshold may be preset to reduce the possibility of making mistakes when performing determination. The similairty degree between the shapes of the pluarlity of parths is higher than the similarity degree.

Figure 2:
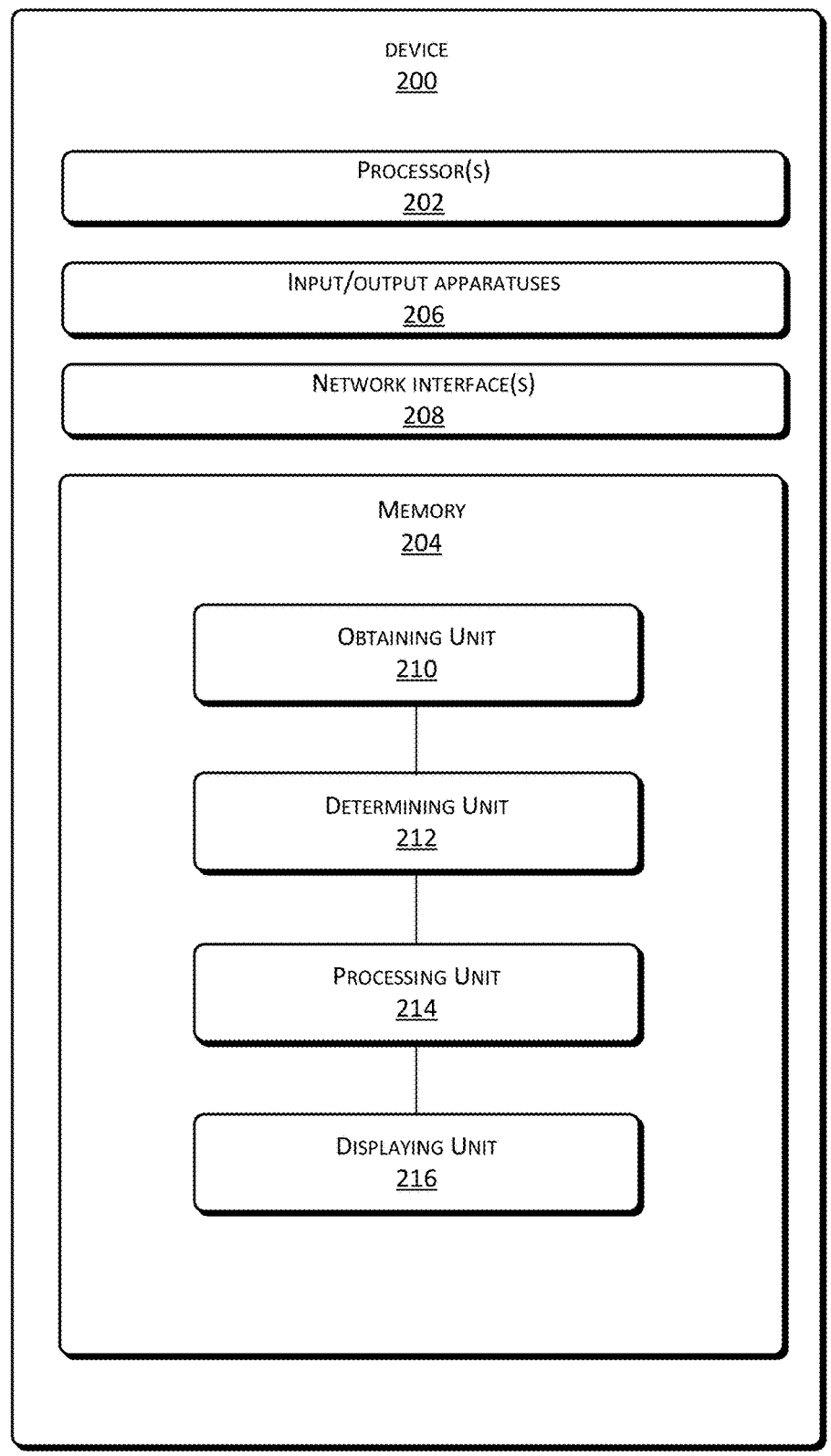
FIG. 2 is a schematic structural diagram of an example information search device according to the present disclosure.

FIG. 2 is a schematic structural view of an information search device according to an embodiment of the present disclosure. As shown in FIG. 2, a device 200 may be applied at mobile terminals. The device 200 may include one or more processor(s) 202 or data processing unit(s) and memory 204. The device 200 may further include one or more input/output apparatuses 206, which may include a screen such as a touch screen, and network interfaces 208. The memory 204 is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The memory 204 may store therein a plurality of modules or units including:

an obtaining unit 210 that obtains a plurality of paths on a screen of a mobile terminal based on monitoring one or more slides of two or more objects such as fingers on a screen, in which one finger corresponds to one path;

a determining unit 212 that determines whether the plurality of paths is consistent;

a processing unit 214 that generates a search interface calling signal if the plurality of paths is consistent; and a displaying unit 216 that displays a search interface according to the search interface calling signal.

For example, the determining unit 212 may include a direction determining sub-unit that determines whether directions of the plurality of paths are consistent, and, if the directions of the plurality of paths are consistent, determines that the plurality of paths is consistent.

For another example, the determining unit 212 may include a first mean square deviation determining sub-unit that determines whether a mean square deviation of start time points of the plurality of paths is smaller than a first threshold, and, if the mean square deviation of the plurality of start time points is smaller than the first threshold, determines that the plurality of paths is consistent.

For another example, the determining unit 212 may include a second mean square deviation determining sub-unit that determines whether a mean square deviation of end time points of the plurality of paths is smaller than a second threshold, and, if the mean square deviation of the plurality of end time points is smaller than the second threshold, determines that the plurality of paths is consistent.

For another example, the determining unit 212 may include a shape determining sub-unit that determines whether shapes of the plurality of paths are similar, and, if the shapes of the plurality of paths are similar, determines that the plurality of paths is consistent.

The above functional units may be implemented as software, hardware, or a combination of software and hardware.

In the example embodiment of the present disclosure, the information search device directly display a search interface in a global scope by using a gesture, which saves time and enhances search efficiency.

Figure 3A:
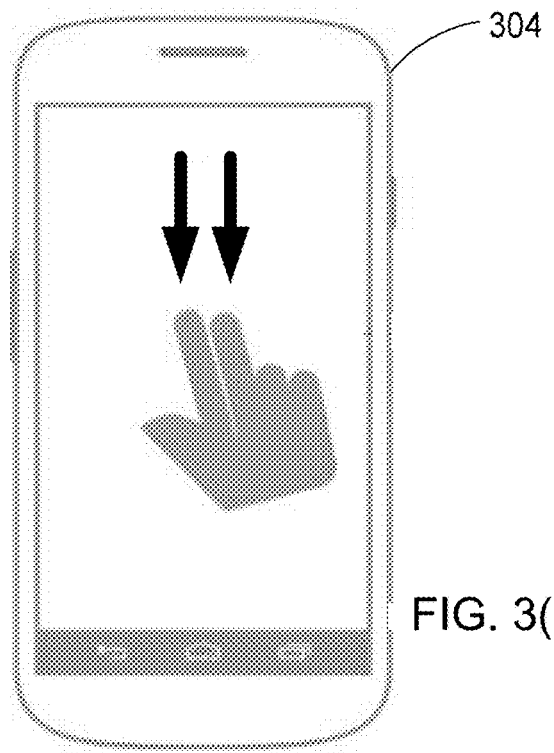
FIGS. 3a-3c are schematic views of an example information search scenario according to the present disclosure.
Figure 3B:
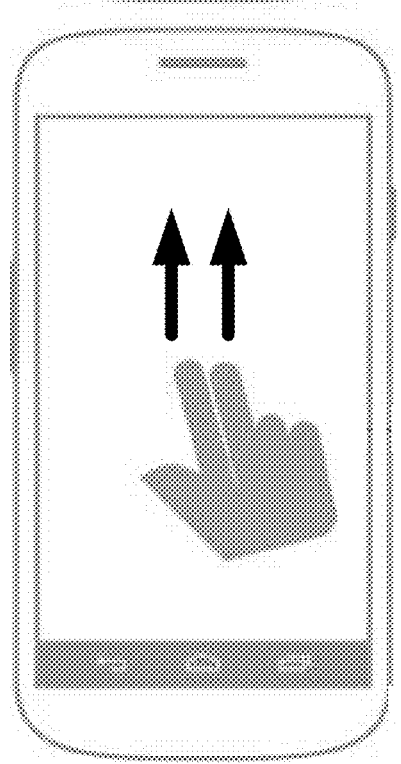
Figure 3C:

FIG. 3 is a schematic view of an example information search scenario according to an example embodiment of the present disclosure. In the application scenario as shown in FIG. 3, by sliding two objects such as fingers on the screen, a search bar 302 is displayed. As shown in FIG. 3, 304 is a mobile terminal, which, for example, may be a cell phone in this example embodiment. On any page in the App, by sliding two objects such as fingers on the screen, for example, sliding from top to bottom as shown in FIG. 3(*a*), or sliding from bottom to top as shown in FIG. 3(*b*), the search bar 302 as shown in FIG. 3(*c*) is directly shown on the screen.

In this embodiment, in the global scope, the user directly displays the search interface by making a gesture, thereby saving the time, and enhancing searching efficiency.

The present disclosure further provides an electronic device. The electronic device may include:
a touch screen;
one or more processors; and
one or more memories having stored thereon computer-executable instructions that are executable by the processors to perform actions including: storing a global interface calling program and at least one application, in which when the application is executed by the processors, the touch screen at least displays an application main interface and several application operation interfaces; when the global interface calling program is executed by the processors, if any one of the application main interface and the several application operation interfaces monitors an input operation performed by sliding at least two objects such as fingers along the touch screen that generates consistent paths, presenting a user interface such as a search interface, which is stacked on the application main interface or the several application operation interfaces. The search interface is presented for inputting a search word by a user.

The information search method provided in the embodiment of the present disclosure calls a search interface by determining whether the paths generated by sliding two or more objects such as fingers on the screen of the mobile terminal are consistent in a global scope, to enable a user to search information via the search interface, which is convenient and fast, saves time, enhances searching efficiency, and offers better user experience for users. In addition, the information search method provided in the embodiment of the present disclosure presents the search interface on any page in the App by using a gesture, without setting an independent search interface on the page, thereby saving system resources.

The above detailed descriptions illustrate the example embodiments of the present disclosure. However, as mentioned above, it shall be understood that, the present disclosure is not restricted to the forms disclosed herein, and is not considered as excluding other embodiments. Instead, the present disclosure is applicable to other various combinations, modifications, and scenarios. In addition, the present disclosure may be modified under the guidance of the above teachings or technique or knowledge in the related art within the scope of the ideas applied in the present disclosure. Moreover, any modification and change made by persons skilled in the art without departing from the sprits and scopes of the present disclosure shall fall within the protection scope attached to the present disclosure.

What is claimed is:

1. A method, comprising:
obtaining a plurality of paths on a screen of a mobile terminal based on monitoring one or more slides of two or more objects on the screen;
setting a similarity degree threshold;
determining that similarity between shapes of the plurality of paths is higher than the similarity degree threshold;
determining that the plurality of paths is consistent; and
calling a user interface in response to the determining that the plurality of paths is consistent.

2. The method of claim 1, wherein the calling the user interface in response to determining that the plurality of paths is consistent comprises generating a search interface calling signal.

3. The method of claim 2, wherein the calling the user interface in response to determining that the plurality of paths is consistent comprises displaying a search interface according to the search interface calling signal.

4. The method of claim 1, wherein a respective finger of two or more fingers corresponds to a respective path of the plurality of paths.

5. The method of claim 1, wherein the determining that the plurality of paths is consistent comprises determining that directions of the plurality of paths are consistent.

6. The method of claim 1, wherein the determining that the plurality of paths is consistent comprises determining that a mean square deviation of start time points of the plurality of paths is smaller than a first threshold.

7. The method of claim 1, wherein the determining that the plurality of paths is consistent comprises determining that a mean square deviation of end time points of the plurality of paths is smaller than a second threshold.

8. The method of claim 1, wherein the objects are fingers.

9. The method of claim 1, wherein the user interface is a search interface.

10. A device, comprising:
one or more processors; and
memory having stored thereon computer-executable components comprising:
an obtaining unit that obtains a plurality of paths on a screen of a mobile terminal based on monitoring one or more slides of two or more objects on the screen;
a determining unit that sets a similarity degree threshold, determines that similarity between shapes of the plurality of paths is higher than the similarity degree threshold, and determines that the plurality of paths is consistent;
a generating unit that generates a search interface calling signal; and
a displaying unit that displays a user interface according to the search interface calling signal.

11. The device of claim 10, wherein a respective finger of two or more fingers corresponds to a respective path of the plurality of paths.

12. The device of claim 10, wherein the determining unit determines that directions of the plurality of paths are consistent.

13. The device of claim 10, wherein the determining unit determines that a mean square deviation of start time points of the plurality of paths is smaller than a first threshold.

14. The device of claim 10, wherein the determining unit determines that a mean square deviation of end time points of the plurality of paths is smaller than a second threshold.

15. One or more computer-readable media storing executable instructions that, when executed by one or more processors, cause the one or more processors to perform acts comprising:
obtaining a plurality of paths on a screen of a mobile terminal based on monitoring one or more slides of two or more objects on the screen;
setting a similarity degree threshold;
determining that similarity between shapes of the plurality of paths is higher than the similarity degree threshold;
determining that the plurality of paths is consistent; and
calling a user interface in response to the determining that the plurality of paths is consistent.

16. The one or more computer-readable media of claim 15, wherein the calling the user interface in response to determining that the plurality of paths is consistent comprises generating a search interface calling signal.

17. The one or more computer-readable media of claim 16, wherein the calling the user interface in response to determining that the plurality of paths is consistent comprises displaying a search interface according to the search interface calling signal.

18. The one or more computer-readable media of claim 15, wherein determining that the plurality of paths is consistent comprises determining that directions of the plurality of paths are consistent.

19. The one or more computer-readable media of claim 15, wherein determining that the plurality of paths is consistent comprises at least one of determining that a mean square deviation of start time points of the plurality of paths is smaller than a first threshold, or determining that a mean square deviation of end time points of the plurality of paths is smaller than a second threshold.

* * * * *